(12) United States Patent
Berg

(10) Patent No.: US 7,708,105 B1
(45) Date of Patent: May 4, 2010

(54) ALL TERRAIN VEHICLE

(75) Inventor: Norman O. Berg, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 1019 days.

(21) Appl. No.: 11/272,888

(22) Filed: Nov. 14, 2005

(51) Int. Cl.
*B62D 21/00* (2006.01)

(52) U.S. Cl. .................................... 180/312

(58) Field of Classification Search ............... 180/89.1, 180/89.11, 908, 312, 311; 280/164.1, 164.2; 296/64; 297/183.1, 243
See application file for complete search history.

(56) References Cited

U.S. PATENT DOCUMENTS

| | | | |
|---|---|---|---|
| 2,984,390 A | 5/1961 | Miller | |
| 3,623,565 A | 11/1971 | Ward et al. | |

(Continued)

FOREIGN PATENT DOCUMENTS

EP      0437 130 A1     7/1991

(Continued)

OTHER PUBLICATIONS http://www.bombardier-atv.com/en-US/Vehicles/2006/rally/Overview.htm, dated printed Nov. 1, 2005.

(Continued)

*Primary Examiner*—Faye M. Fleming
(74) *Attorney, Agent, or Firm*—Baker & Daniels LLP

(57) ABSTRACT

An all-terrain vehicle (ATV) includes a straddle-type seat mounted on a frame of the vehicle generally above and between left and right rear wheels. A left rear fender of the ATV is disposed over the left rear wheel and includes a left surface extending alongside a left side of the seat, the left fender surface may be disposed flush with or above a seating area of the seat. A right rear fender is disposed over the right rear wheel and includes a right fender surface extending alongside a right side of the seat, the right fender surface may be disposed flush with or above the seating area of the seat. The left and right rear fenders may each further provide a resilient interface for an operator shifting over the left and right sides of the seat, respectively.

44 Claims, 7 Drawing Sheets

U.S. PATENT DOCUMENTS

| | | | |
|---|---|---|---|
| 3,776,325 | A | 12/1973 | Jespersen |
| D299,324 | S | 1/1989 | Oba et al. |
| D299,631 | S | 1/1989 | Oba et al. |
| 4,799,708 | A | 1/1989 | Handa et al. |
| D305,999 | S | 2/1990 | Ueda et al. |
| 4,946,193 | A | 8/1990 | Oka |
| D312,227 | S | 11/1990 | Miyamoto et al. |
| 5,327,989 | A | 7/1994 | Furuhashi et al. |
| 5,845,918 | A | 12/1998 | Grinde et al. |
| D424,982 | S | 5/2000 | Deutschman |
| 6,206,446 | B1 * | 3/2001 | Slayden ............... 296/77.1 |
| D468,117 | S | 1/2003 | Kalhok et al. |
| 6,547,027 | B1 | 4/2003 | Kalhok et al. |
| D485,212 | S | 1/2004 | Wu |
| 6,732,830 | B2 | 5/2004 | Gagnon et al. |
| D492,916 | S | 7/2004 | Rondeau et al. |
| 6,874,590 | B2 | 4/2005 | Rondeau et al. |
| 7,121,371 | B2 * | 10/2006 | Rondeau et al. ............ 180/89.1 |
| 7,350,854 | B2 * | 4/2008 | Harper ...................... 296/198 |
| 2004/0124028 | A1 | 7/2004 | Lachapelle et al. |
| 2004/0129485 | A1 | 7/2004 | Rondeau et al. |
| 2004/0134707 | A1 | 7/2004 | Rondeau et al. |
| 2004/0256853 | A1 | 12/2004 | Mercier et al. |

FOREIGN PATENT DOCUMENTS

| | | | |
|---|---|---|---|
| KR | 2005008936 | A * | 1/2005 |
| KR | 2005051322 | A * | 6/2005 |

OTHER PUBLICATIONS

*American National Standard for Four Wheel All-Terrain Vehicles—Equipment, Configuration, and Performance Requirements*, American National Standards Institute, Inc., Feb. 15, 2001.

\* cited by examiner

ALL TERRAIN VEHICLE

TECHNICAL FIELD

The present invention relates to all-terrain vehicles (ATV's) and more particularly to ATV's configured to provide a feeling of improved stability and comfort for an operator or driver.

BACKGROUND

Typical ATV's are configured with a straddle seat positioned rather high on the vehicle, with the intent to give an operator or driver straddling the seat an enhanced line of vision and to allow the operator freedom of movement to shift his or her body weight for balancing the vehicle when traversing rough and/or sloping terrain. Operators who are not accustomed to such an interactive riding style may have a sense of instability straddling these rather high seats. Accordingly there is a need for an ATV that is configured for an adult operator and providing a lower seating position so that the operator may feel more stable. It is desirable that such an ATV be further configured to provide additional stability, along with a comfortable and ergonomic seating position for the operator. It should be noted that the term 'adult operator' is used herein to distinguish from relatively smaller youth operators, and embodiments of the present invention are directed toward ATV's generally sized to accommodate an operator being of a size approximately corresponding to that of a standard adult operator or driver.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the present invention.

Figure 1:
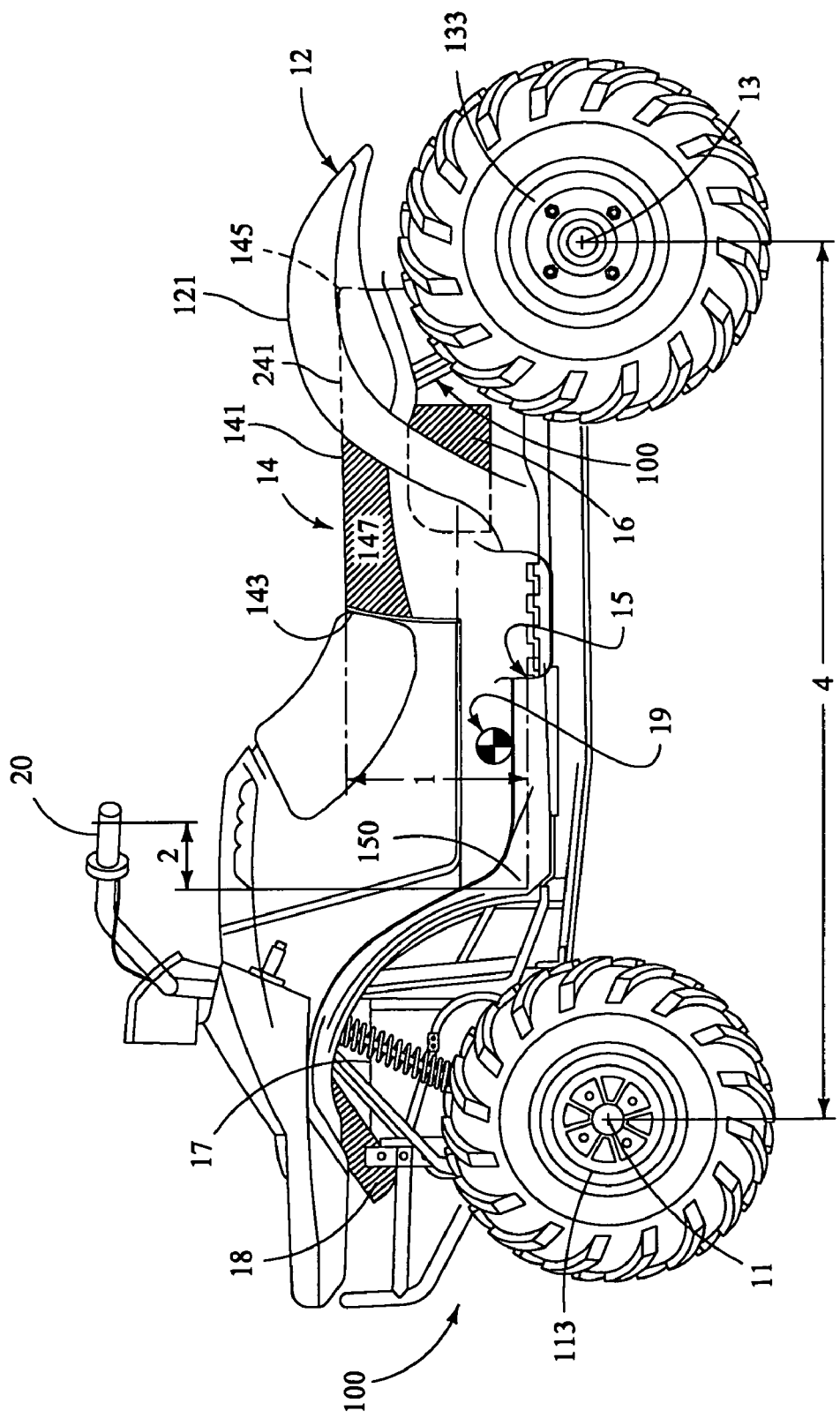
FIG. 1 is a side elevation view of an exemplary ATV configured according to some embodiments of the present invention.
Figure 2A:
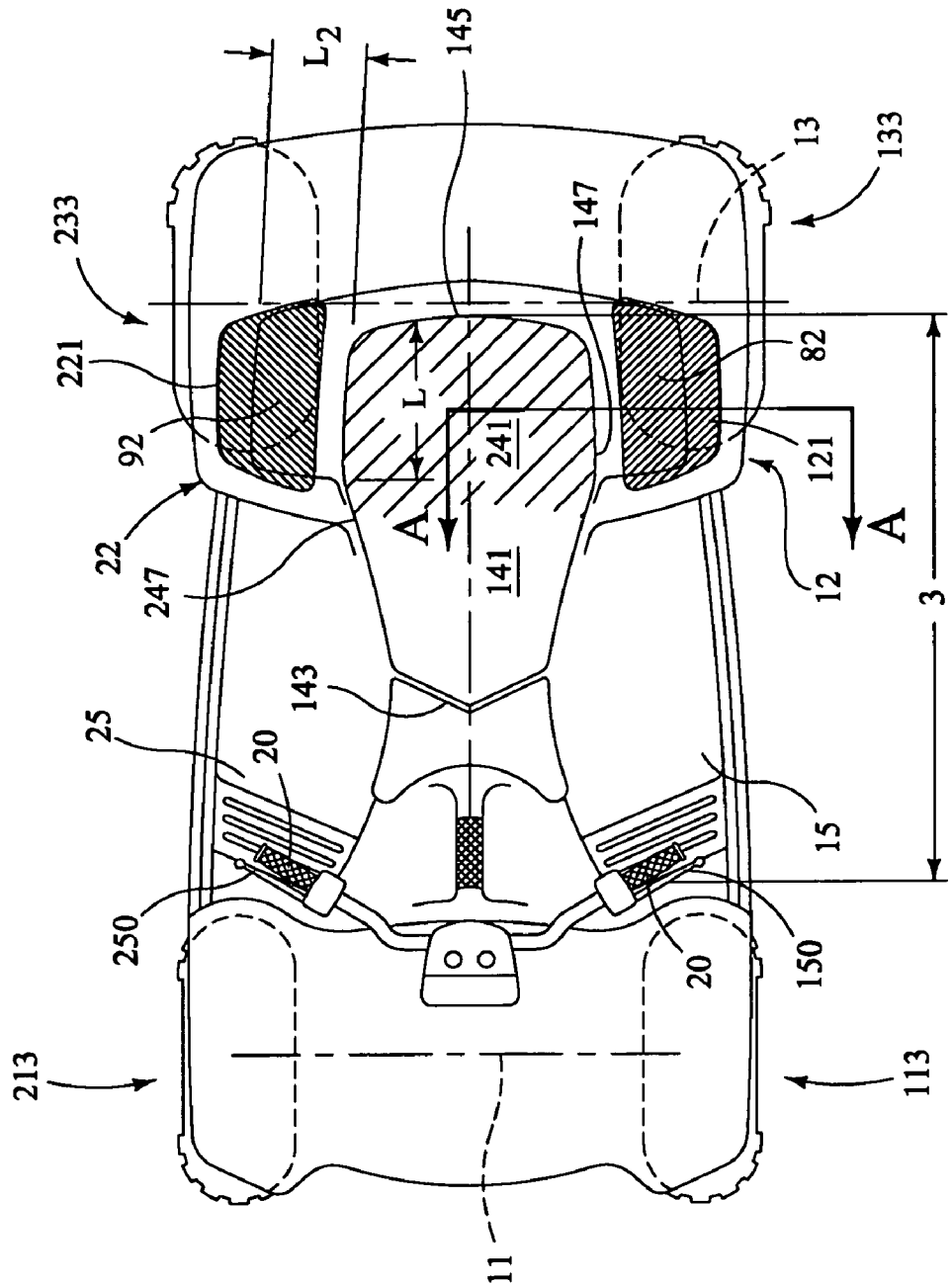
FIG. 2A is a top plan view of the exemplary ATV configured according to some embodiments of the present invention.
Figure 2:
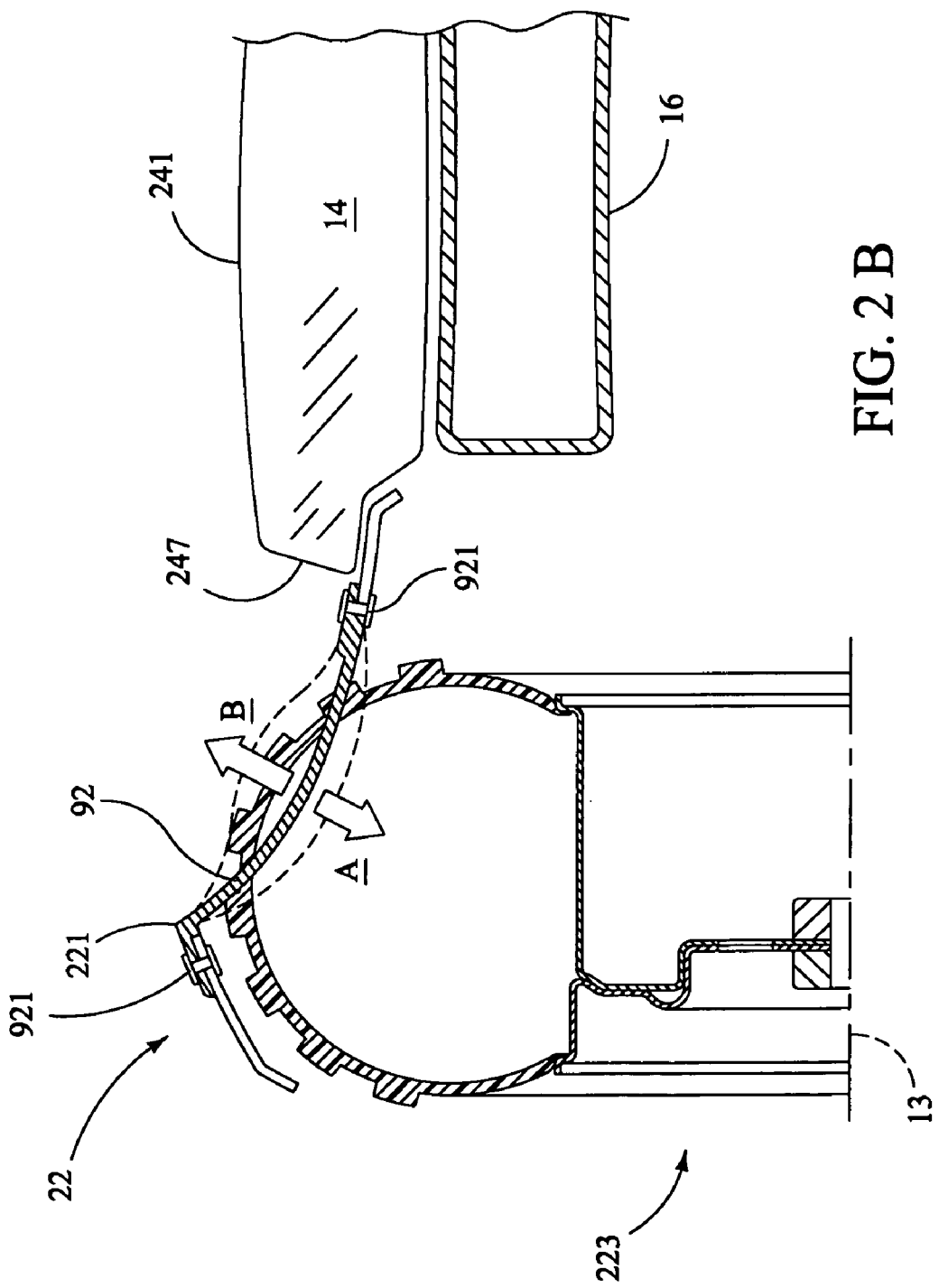
FIG. 2B is a section view through line A-A of FIG. 2A.

FIGS. 1 and 2A are a side elevation view and a top plan view, respectively, of an exemplary ATV 10 configured according to some embodiments of the present invention. FIGS. 1 and 2A illustrate ATV 10 including a frame 100, from which a left front wheel 113, a right front wheel 213, a left rear wheel 133 and a right rear wheel 233 are suspended, a front axle 11 extending between left and right front wheels 113, 213, and a rear axle 13 extending between left and right rear wheels 133, 233; a straddle-type seat 14 is mounted on frame 100 generally above and between left and right rear wheels 133, 233. FIGS. 1 and 2A further illustrate left and right rear fenders, 12 and 22, respectively, disposed on either side of seat 14, and seat 14 including a front end 143, a back end 145, a left side 147, a right side 247 and a top surface 141 extending from front end 143 to back end 145 and from left side 147 to right side 247. Seat top surface 141 includes a relatively flat portion, disposed between fenders 12, 22, that serves as a seating area 241, a major portion of which is shown disposed between fenders 12, 22 and the extent of which is generally designated by cross-hatching in FIG. 2A.

FIG. 2B is a section view through line A-A of FIG. 2A. FIGS. 1 and 2A-B further illustrate left and right fenders 12, 22 including surfaces 121 and 221, respectively, extending alongside seat 14. According to some embodiments, a length L of seat 14 disposed between fenders 12, 22, generally corresponding to seating area 241, is approximately ten inches to approximately fifteen inches long. According the illustrated embodiments, top surface 141 of seat 14 is disposed at a height above rear axle 13 such that surfaces 121 and 221 of left fender 12 and right fender 22, respectively, are disposed above seating area 241. The height of seating area 241 is relatively low, for example three to six inches lower than a traditional ATV seat height, according to some embodiments, so that an operator seated upon seating area 241 may enjoy an enhanced sense of stability.

FIGS. 2A-B further illustrate each fender 12, 22 including a flexible or resilient panel 82, 92, respectively, disposed alongside seating area 241; panel 82 is shown extending laterally from seat left side 147 to fender surface 121 and panel 92 is shown extending laterally from seat right side 247 to fender surface 221. Panels 82, 92 are each integrated into a main portion of the corresponding fender 12, 22, the main portions being formed of a high density polyethylene or other relatively rigid thermoplastic, while panels 82, 92 are formed of a relatively flexible material, for example a thermoplastic elastomer such as Kraton G-7820 or EPDM rubber. Panels 82, 92 may be coupled to corresponding main portions of fenders 12, 22 via any type of fastening means known to those skilled in the art. In FIG. 2B, panel 92 is shown coupled to the main portion of fender 22 by bolt-type fasteners 921, which may be spaced about a perimeter of each panel 82, 92. According to the illustrated embodiments, for a operator that has shifted to the left or right of seating area 241, flexible or resilient panels 82, 92 provide a more 'giving' interface than would a standard fender surface, for example one formed from high density polyethylene. Arrows A and B in FIG. 2B represent an exemplary flexing of panel 92: per arrow A, in response to a load applied by a operator's weight shifting onto fender 22, and, per arrow B, in response to a release of the loading when the operator shifts back over seat 14. According to alternate embodiments of the present invention, rather than panels 82, 92, cushioned or padded overlays are attached to relatively rigid fender surfaces in locations generally corresponding to the locations of panels 82, 92.

Figure 3A:
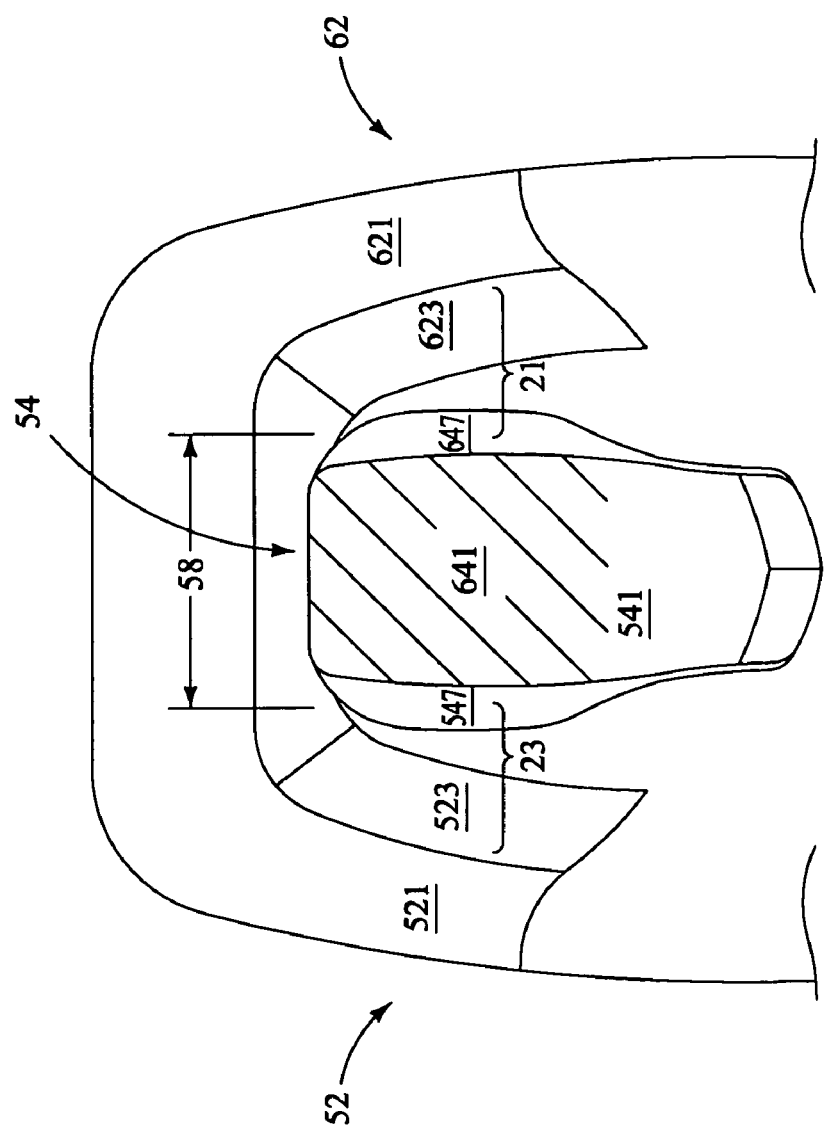
FIG. 3A is a top view and FIGS. 3B-C are perspective views of portions of ATV's according to alternate embodiments of the present invention.

FIG. 3A is a top view of a portion of an ATV 500 illustrating an embodiment including fenders 52, 62 including inner side surfaces 523, 623 spaced apart from sides of a seat 54 by a first lateral gap 21, between a left side 647 of seat 54 and inner side surface 623, and a second lateral gap 23 between a right side 547 of seat 54 and inner side surface 523. FIG. 3A further illustrates seat 54 including a top surface 541, a portion of which forms a seating area 641 disposed between fender surfaces 521 and 621; according to some embodiments, fender surfaces 521, 621 are disposed flush with or above seating area 641. A width 58 of seating area 641 between gaps 21, 23 may be between approximately 13 inches and approximately 18 inches. Gaps 21 and 23 may be between approximately 6 inches and 8 inches wide, and may give an operator more space to shift his or her weight from side to side, in maneuvering ATV 500, without bumping up against fenders 52, 62. However, according to some embodiments, fenders 52, 62 include a resilient interface, for example padding or cushioning, formed along all or a portion of each fender inner side surface 523, 623, so, if an operator, shifting to left side 647 or right side 547 of seat 54, does come up against either of surfaces 523, 623, the surfaces will provide a relatively 'giving' or soft interface.

Figure 3B:
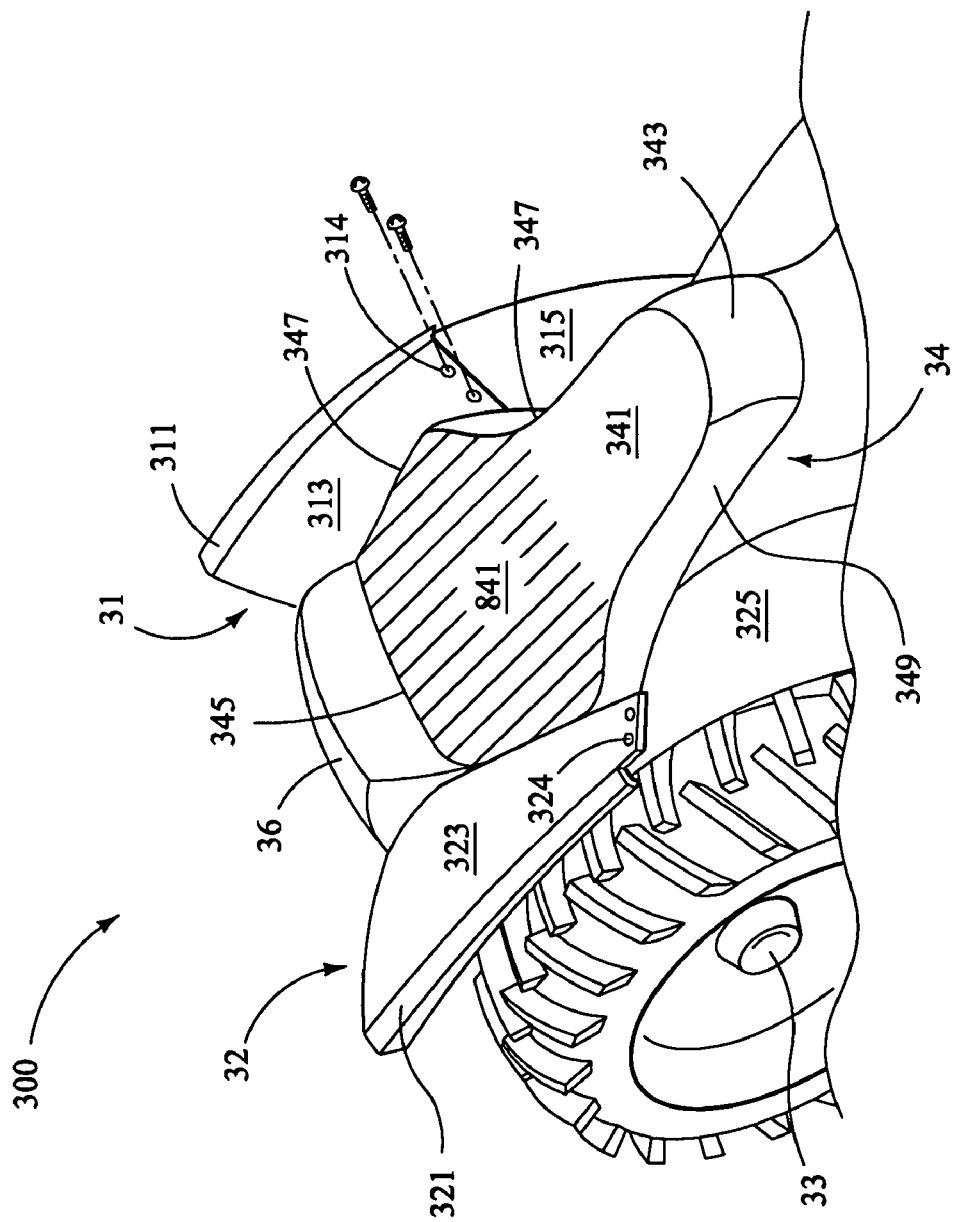

FIG. 3B is a perspective view of a portion of an ATV 300 according to an alternate embodiment of the present invention. FIG. 3B illustrates ATV 300 including a straddle-type seat 34 disposed between a left rear fender 31 and a right rear fender 32, each fender 31, 32 being disposed over a rear wheel of ATV 300, for example, as shown, fender 32 over wheel 33. FIG. 3B further illustrates seat 34 including a front end 343, a back end 345, a left side 347, a right side 349, and a top surface 341 extending from front end 343 to back end 345 and from left side 347 to right side 349; a seating area 841 of top surface 341 may be a relatively flat portion of surface 341 disposed between fenders 31, 32. According to FIG. 3B, seating area 841 is recessed between a flared upper portion 313 of left fender 31 and a flared upper portion 323 of right fender 32; upper portions 313, 323 each include an upper surface 311 and 321, respectively, and each portion 313, 323 extends upward and laterally out from seat sides 347, 349 to respective upper surface 311, 321, which are located in proximity to seat back end 345. As previously described, a relatively low seating position upon seating area 841, as illustrated in FIG. 3B, may enhance an operator's sense of stability. Seat 34 may further including a back rest 36, as illustrated in FIG. 3B.

According to some embodiments of the present invention, upper portions 313, 323 of fenders 31, 32 are constructed to provide a flexible, 'giving' or resilient interface for an operator desiring to shift his or her weight over either side 347, 349 of seat 34, for example, to aid in balancing ATV 300. FIG. 3B further shows upper portions 313, 323 of fenders 31, 32 each transitioning to a respective lower portion 315, 325; lower portions 315, 325 each extend downward in a direction generally following a perimeter of the respective vehicle wheel. According to one set of embodiments, flared portions 313, 323 are wholly constructed of a flexible material, for example a thermoplastic elastomer such as Kraton G-7820 or EPDM rubber, and are each coupled to respective lower portion 315, 325, for example by riveting at a respective joint 314, 324; lower portions 315, 325 are more rigid than the upper portions 313, 323 being formed, for example, from a high density polyethylene. According to an alternate set of embodiments, upper portions 313, 323 each include a relatively rigid core overlaid with a soft or resilient padding, for example a foam cushion, which extends over the core upward from seat sides 347, 349; each of the rigid cores of flared portions 313, 323 may be continuous with respective lower portion 315, 325, thus eliminating the need for joints 314, 324.

Figure 3C:
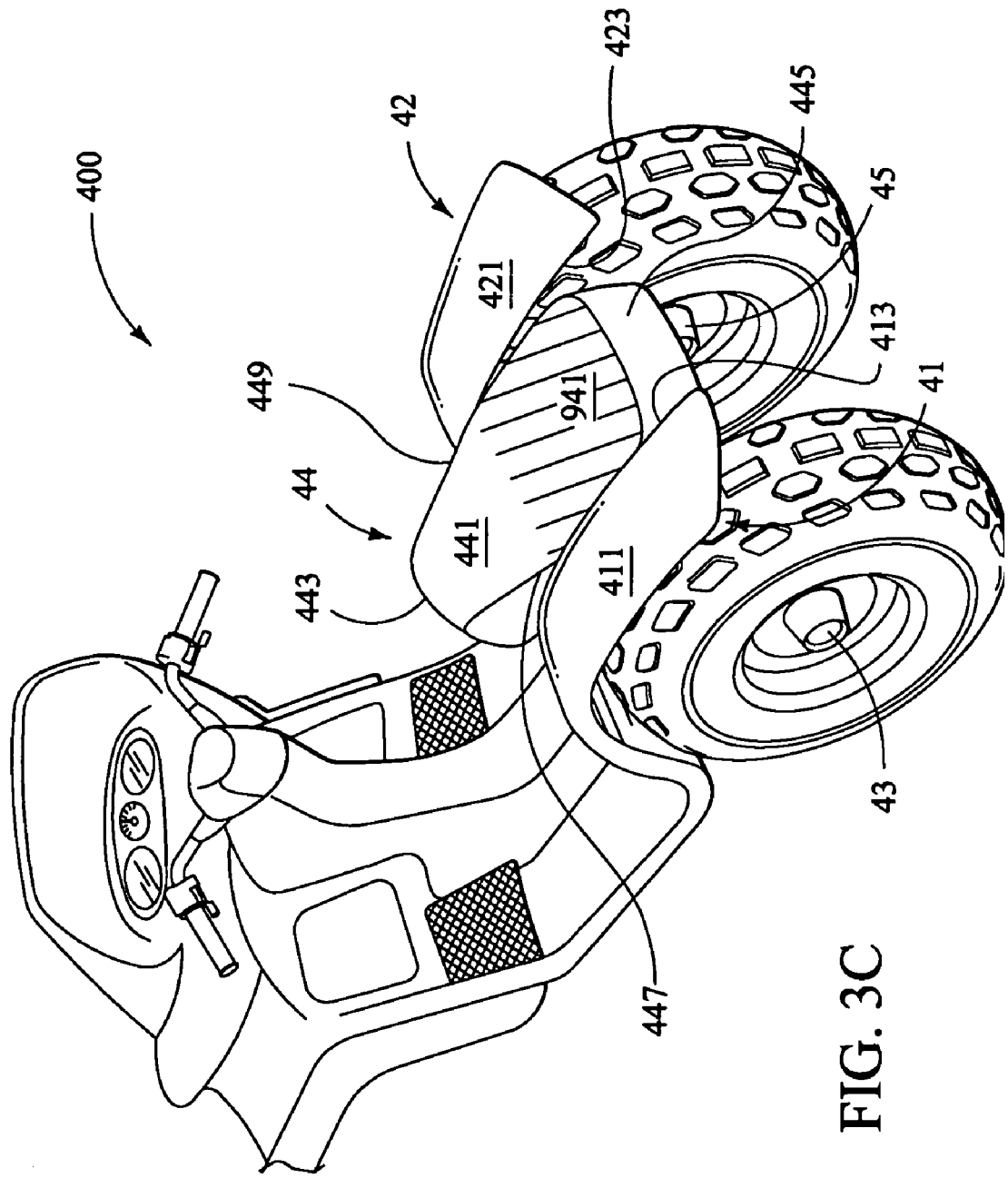

FIG. 3C is a perspective view of an ATV 400 according to another alternate embodiment of the present invention. FIG. 3C illustrates ATV 400 including a straddle-type seat 44 disposed between a left rear fender 41 and a right rear fender 42; left rear fender 41 is disposed over a left rear wheel 43 and includes an upper surface 411 and right rear fender 42 is disposed over a right rear wheel 45 and includes an upper surface 421. FIG. 3C further illustrates seat 44 including a front end 443, a back end 445, a left side 447, a right side 449 and a top surface 441 extending from front end 443 to back end 445 and from left side 447 to right side 449. According to the illustrated embodiment, seat top surface 441 includes a seating area 941 that provides a relatively low seating position on ATV 400 approximately flush with surfaces 411, 421 of fenders 41, 42. According to some embodiments, fender surfaces 411, 421 are constructed to provide a resilient interface for an operator desiring to shift his or her weight over either side 447, 449 of seat 44; surfaces 411, 421 may be wholly constructed of a flexible material, may include flexible panels, for example like panels 82, 92 shown in FIGS. 2A-B, or may have a cushion layer extending thereover, similar to embodiments described in conjunction with FIG. 3B.

Returning to FIGS. 1 and 2A, it can be seen that ATV 10 further includes left and right footrest surfaces 15, 25, each disposed at a vertical distance 1 below seat 14, and each footrest surface 15, 25 includes a front end 150, 250 disposed at a horizontal distance 3 from a rear portion of seating area 241. According to some embodiments of the present invention, due to the relatively low seat position, vertical distance 1 is no greater than approximately 18 to 20 inches; such a vertical distance obliges horizontal distance 3 to be greater than approximately 35 inches, so that an operator, sitting upon seat 14, may place their feet upon footrest surfaces 15, 25 at front ends 150, 250 without having to bend his or her knees too tightly. A distance 4 between front and rear wheel axles 11, 13 may be between approximately 48 inches and approximately 60 inches to accommodate distance 3, being suitable for an operator having a leg length approximating that of a standard adult operator. Although footrest surfaces 15, 25 are illustrated as floor boards of ATV 10, embodiments of the present invention are not limited to this type of footrest surface; other types of surfaces that may be incorporated include, but are not limited to, foot pegs and netting. According to some embodiments footrest surface front ends 150, 250 are upwardly inclined, for example as shown with dashed lines in FIG. 1. FIGS. 1 and 2A further illustrate ATV 10 including handlebar grips 20 disposed rearward of footrest surface front ends 150, 250 by a distance 2, which may be between approximately 1 inch and approximately 7 inches, preferably approximately 5 inches to 7 inches; the rearward position of grips 20 may better enable an operator seated lower and on a longer wheel base to comfortably reach grips.

Figure 4:
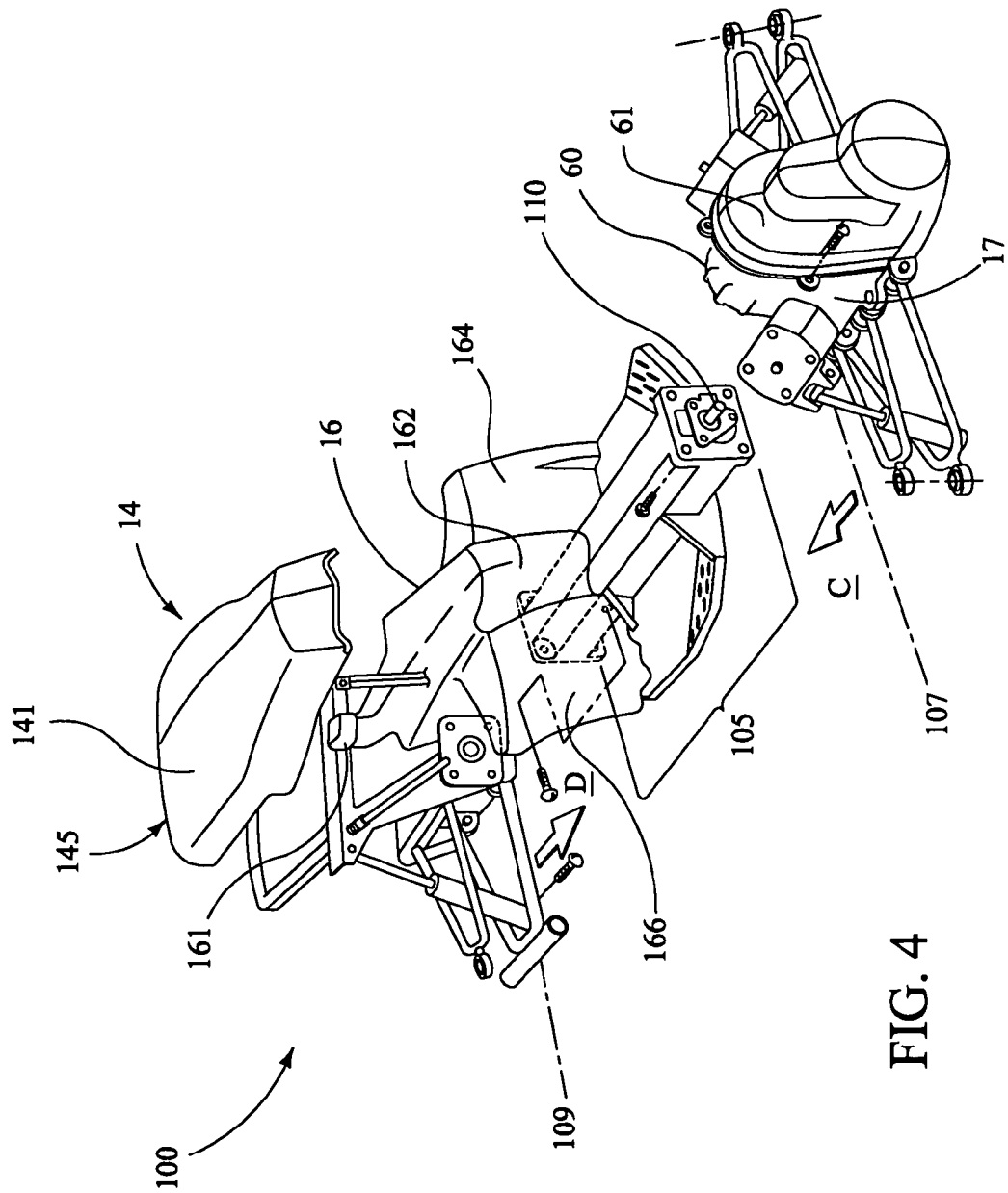
FIG. 4 is an exploded perspective view of an ATV frame including components mounted thereon according to some embodiments of the present invention.

FIG. 1 further shows ATV 10 including a fuel tank 16 mounted on a rear portion of frame 100 beneath seat 14, an engine 17 mounted on a front portion of frame 100, including a portion extending over front axle 11, and a radiator 18 mounted generally above engine 17. According to another aspect of the present invention, relatively massive elements contributing more significantly to a mass of ATV 10, for example engine 17 and filled fuel tank 16, are mounted in locations such that a center of gravity of ATV 10, generally denoted at 19, is disposed generally low with respect to a ground surface over which ATV 10 travels. Furthermore, according to the illustrated embodiment, center of gravity 19 would not be significantly raised by an operator being seated upon seat 14, since seating area 241 is positioned relatively low as well. FIG. 4 is an exploded perspective view of ATV frame 100 wherein locations of engine 17 and fuel tank 16 may be seen more clearly.

FIG. 4 illustrates frame 100 including a front frame portion 107 and a rear frame portion 109 that would be coupled to a center frame member 105 per arrows C and D, respectively; a drive shaft 110 is shown extending longitudinally through center frame member 105. Engine 17 and transmission 60 are shown integrated into front frame portion 170; seat 14 is shown positioned to be mounted on rear frame portion 109; and fuel tank 16 is shown mounted on center frame member 105, to extend beneath seat 14 when rear frame portion 109 is coupled to center frame member 105. Fuel tank 16 includes a fill port 161, which is shown disposed near a rear end of fuel tank 16; when frame 100 is assembled, port 161 may be disposed rearward of back end 145 of seat 14 or beneath seat 14, adjacent rear end 145. According to the illustrated embodiment, fuel tank 16 further includes side portions 164 and 166 extending laterally from either side of a main tank portion 162 to increase a volume capacity of main tank portion 162; side portions 164 and 166, as illustrated, each have a profile so that they may form lower extensions of fenders 12 and 22 (FIGS. 1 and 2A), respectively. FIG. 4 further illustrates center frame member 105 having a mono-tube construction, which may be designed to have a relatively low profile, for example an 8-10 inch cross-section, while providing adequate torsional stiffness to frame 100 without requiring additional supporting members, for example an upper frame member, which is absent in frame 100 to maintain the relatively low center of gravity 19.

In the foregoing detailed description, the invention has been described with reference to specific embodiments. However, it may be appreciated that various modifications and changes can be made without departing from the scope of the invention as set forth in the appended claims.

The invention claimed is:

1. An all-terrain vehicle, comprising:
a frame;
a left rear wheel suspended from the frame, a right rear wheel suspended from the frame, a rear wheel axis extending between the left and right rear wheels, a left front wheel suspended from the frame, a right front wheel suspended from the frame, a front wheel axis extending between the left and right front wheels and spaced apart from the rear wheel axis a distance greater than or equal to approximately 48 inches;
a straddle-type seat mounted on the frame generally above and between the left and right rear wheels, the seat including a front end, a back end, a left side extending between the front end and the back end, a right side extending between the front end and the back end, a top surface extending from the front end to the back end and from the left side to the right side, and a seating area formed by a portion of the top surface in proximity to the back end;
a left rear fender mounted on the frame and disposed over the left rear wheel, the left rear fender including a left fender surface extending alongside the seating area of the seat, the left fender surface disposed flush with or above the seating area of the seat; and
a right rear fender mounted on the frame and disposed over the right rear wheel, the right rear fender including a right fender surface extending alongside the seating area of the seat, the right fender surface disposed flush with or above the seating area of the seat.

2. The vehicle of claim 1, further comprising: a first lateral gap between the left fender surface and the left side of the seat; and a second lateral gap between the right fender surface and the right side of the seat.

3. The vehicle of claim 1, wherein the left rear fender further includes a left fender inner side surface extending alongside the left side of the seat and the right rear fender further includes a right fender inner side surface extending alongside the right side of the seat; and further comprising:
a first gap between the left fender inner side surface and the left side of the seat; and a second gap between the right fender inner side surface and the right side of the seat.

4. The vehicle of claim 1, further comprising a left footrest surface and a right foot rest surface, each footrest surface disposed at a vertical distance of no greater than approximately 20 inches below the seating area of the seat.

5. The vehicle of claim 4, wherein the left and right footrest surfaces each include an upwardly inclined front end.

6. The vehicle of claim 4, wherein the left and right footrest surfaces each include a front end disposed forward of a rear portion of the seating area of the seat at a horizontal distance greater than approximately 35 inches.

7. The vehicle of claim 6, further comprising handlebars including grips and wherein the handlebar grips are disposed rearward of the front ends of the left and right footrest surfaces.

8. The vehicle of claim 7, wherein the handlebar grips are disposed rearward of the front ends of the left and right footrest surfaces by a horizontal distance of no less than approximately 1 inch.

9. The vehicle of claim 7, wherein the handlebar grips are disposed rearward of the front ends of the left and right footrest surfaces by a horizontal distance of between approximately 5 inches and approximately 7 inches.

10. The vehicle of claim 1, wherein the distance that the rear wheel axis is spaced apart from the front wheel axis is greater than or equal to approximately 55 inches.

11. The vehicle of claim 1, further comprising a fuel tank mounted on a rear portion of the frame below the seat, a portion of the tank vertically aligned with a portion of the seat.

12. The vehicle of claim 11, further comprising a fuel tank fill port disposed rearward of the back end of the seat.

13. The vehicle of claim 11, further comprising a fuel tank fill port disposed beneath the seat in proximity to the back end.

14. The vehicle of claim 11, wherein the fuel tank includes a left side portion and a right side portion, the left side portion forming a lower portion of the left fender and the right side portion forming a lower portion of the right fender.

15. The vehicle of claim 1, further comprising:
a rear wheel axis extending between the left and right rear wheels;
a front wheel axis extending between the left and right front wheels; and
an engine mounted on a front portion of the frame, a portion of the engine positioned over the front wheel axis.

16. The vehicle of claim 15, further comprising a radiator mounted on the front portion of the frame generally above the engine.

17. The vehicle of claim 1, wherein:
the left fender surface provides a first resilient interface for an operator shifting over the left side of the seat; and
the right fender surface provides a second resilient interface for the operator shifting over the right side of the seat.

18. The vehicle of claim 17, wherein the left and right fender surfaces are each formed of a flexible material providing the first and second resilient interfaces.

19. The vehicle of claim 17, wherein the left and right fender surfaces each include a cushioned overlay providing the first and second resilient interfaces.

20. The vehicle of claim 1, wherein:
the left rear fender further includes a left flexible panel extending from the left side of the seat to the left fender surface; and
the right rear fender further includes a right flexible panel extending from the right side of the seat to the right fender surface.

21. The vehicle of claim 1, wherein:
the left rear fender extends upward and outward from the left side of the seat to the left rear fender surface and provides a first resilient interface for an operator shifting over the left side of the seat; and
the right rear fender extends upward and outward from the right side of the seat to the right rear fender surface and provides a second resilient interface for the operator shifting over the right side of the seat.

22. The vehicle of claim 21, wherein the left and right fenders are each formed of a flexible material providing the first and second resilient interfaces.

23. The vehicle of claim 21, wherein the left and right fenders each include a cushioned overlay providing the first and second resilient interfaces.

24. The vehicle of claim 3, wherein:
the left fender inner side surface provides a first resilient interface for an operator shifting over the left side of the seat; and
the right fender inner side surface provides a second resilient interface for the operator shifting over the right side of the seat.

25. An all-terrain vehicle, comprising:
a frame;
a left rear wheel and a right rear wheel suspended from the frame;
a straddle-type seat mounted on the frame generally above and between the left and right rear wheels, the seat including a front end, a back end, a left side extending between the front end and the back end, a right side extending between the front end and the back end, and a top surface extending from the front end to the back end and from the left side to the right side; and
a left rear fender mounted on the frame and disposed over the left rear wheel, the left rear fender providing a first resilient interface for an operator shifting over the left side of the seat; and
a right rear fender mounted on the frame and disposed over the right rear wheel, the right rear fender providing a second resilient interface for the operator shifting over the right side of the seat.

26. The vehicle of claim 25, wherein:
the left rear fender includes a left fender surface extending alongside the left side of the seat and disposed flush with or above at least a portion of the top surface of the seat; and
the right rear fender includes a right fender surface extending alongside the right side of the seat and disposed flush with or above at least a portion of the top surface of the seat.

27. The vehicle of claim 26, wherein the left and right fender surfaces are each formed of a flexible material providing the first and second resilient interfaces.

28. The vehicle of claim 26, wherein the left and right fender surfaces each include a cushioned overlay providing the first and second resilient interfaces.

29. The vehicle of claim 26, further comprising:
a first lateral gap between the left fender surface and the left side of the seat; and
a second lateral gap between the right fender surface and the right side of the seat.

30. The vehicle of claim 25, wherein:
the left rear fender includes a left upper portion extending upward and outward from the left side of the seat; and
the right rear fender includes a right upper portion extending upward and outward from the right side of the seat.

31. The vehicle of claim 30, wherein the left and right upper portions are each formed of a flexible material providing the first and second resilient interfaces.

32. The vehicle of claim 31, wherein:
the left rear fender further includes a left lower portion to which the left upper portion is coupled, the left lower portion being more rigid than the left upper portion and extending downward from the left upper portion in a direction generally following a perimeter of the left rear wheel; and
the right rear fender further includes a right lower portion to which the right upper portion is coupled, the right lower portion being more rigid than the right upper portion and extending downward from the right upper portion in a direction generally following a perimeter of the right rear wheel.

33. The vehicle of claim 30, wherein the left and right upper portions each include a cushioned overlay providing the first and second resilient interfaces.

34. The vehicle of claim 25, wherein the left rear fender includes a left fender inner side surface extending alongside the left side of the seat, and the right rear fender includes a right fender inner side surface extending alongside the right side of the seat, and further comprising:
a first gap between the left fender inner side surface and the left side of the seat; and
a second gap between the right fender inner side surface and the right side of the seat.

35. The vehicle of claim 34, wherein the left and right fender inner side surfaces each include a cushioned overlay providing the first and second resilient interfaces.

36. The vehicle of claim 26, wherein:
the left rear fender further includes a left flexible panel extending from the left side of the seat to the left fender surface; and
the right rear fender further includes a right flexible panel extending from the right side of the seat to the right fender surface;
wherein the left and right panels provide the first and second resilient interfaces.

37. The vehicle of claim 1, wherein a portion of the left rear wheel, a portion of the right rear wheel, a portion of the left rear fender, a portion of the right rear fender, and a portion of the seat cooperate to define a cross-section of the vehicle, the portions of the left rear fender and the right rear fender are positioned at an elevation at or above the portion of the seat.

38. The vehicle of claim 2, wherein the left and right fender surfaces are concave.

39. The vehicle of claim 2, wherein first and second lateral gaps have a combined width that is greater than the lateral width of the seat.

40. The vehicle of claim 2, wherein a portion of the first lateral gap is positioned directly above the left rear wheel.

41. The vehicle of claim 25, wherein the left rear fender includes a main portion and a panel defining the first resilient interface, the panel is fastened to the main portion.

42. The vehicle of claim 41, wherein the panel extends between the main portion and the seat.

43. The vehicle of claim 41, wherein the panel is made of more flexible material than the main portion.

44. The vehicle of claim 25, wherein the left rear fender includes a main portion defining an aperture and a flexible portion defining the first resilient interface and covering at least a portion of the aperture, the flexible portion being positioned to flex under force from the operator's leg during operator shifting.

* * * * *